United States Patent
Mashal et al.

(10) Patent No.: US 11,851,799 B2
(45) Date of Patent: Dec. 26, 2023

(54) SYSTEMS AND METHODS OF OPERATING A WASHING MACHINE APPLIANCE TO DETECT AND MITIGATE OUT-OF-BALANCE CONDITIONS

(71) Applicant: Haier US Appliance Solutions, Inc., Wilmington, DE (US)

(72) Inventors: Khalid Jamal Mashal, Louisville, KY (US); David Scott Dunn, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 66 days.

(21) Appl. No.: 17/211,979

(22) Filed: Mar. 25, 2021

(65) Prior Publication Data

US 2022/0307186 A1    Sep. 29, 2022

(51) Int. Cl.
*D06F 34/16*    (2020.01)
*D06F 34/18*    (2020.01)
*G06T 7/70*    (2017.01)
*D06F 103/06*    (2020.01)
*D06F 105/02*    (2020.01)
*D06F 105/08*    (2020.01)
*D06F 105/48*    (2020.01)
*D06F 103/04*    (2020.01)

(52) U.S. Cl.
CPC .............. *D06F 34/16* (2020.02); *D06F 34/18* (2020.02); *G06T 7/70* (2017.01); *D06F 2103/04* (2020.02); *D06F 2103/06* (2020.02); *D06F 2105/02* (2020.02); *D06F 2105/08* (2020.02); *D06F 2105/48* (2020.02); *G06T 2207/20081* (2013.01); *G06T 2207/20084* (2013.01)

(58) Field of Classification Search
CPC ....... D06F 34/16; D06F 2103/26; D06F 33/48
See application file for complete search history.

(56) References Cited

U.S. PATENT DOCUMENTS

| | | | |
|---|---|---|---|
| 10,273,623 B2 | 4/2019 | Hombroek | |
| 2011/0113569 A1* | 5/2011 | Ashrafzadeh | ........... D06F 21/04 8/159 |
| 2011/0308023 A1* | 12/2011 | Park | ...................... D06F 35/005 68/12.01 |

(Continued)

FOREIGN PATENT DOCUMENTS

| EP | 3309285 A1 | 4/2018 |
|---|---|---|
| WO | WO2018076082 A1 | 5/2018 |

*Primary Examiner* — Spencer E. Bell
(74) *Attorney, Agent, or Firm* — Dority & Manning, P.A.

(57) ABSTRACT

A washing machine appliance includes a wash basket that is rotatably mounted within a wash tub and that defines a wash chamber for receiving a load of clothes. A motor assembly selectively rotates the wash basket, a drain pump assembly selectively drains wash fluid from the wash tub, and a camera assembly is used to monitor an out-of-balance value to minimize out-of-balance issues. Specifically, a controller of the washing machine appliance uses the camera assembly to obtain one or more images of the wash chamber, analyze the one or more images using a machine learning image recognition process to determine the out-of-balance value of the load of clothes in the wash basket, and perform a cloth redistribution process based at least in part on determining that the out-of-balance value is greater than a predetermined out-of-balance threshold.

18 Claims, 5 Drawing Sheets

(56) References Cited

U.S. PATENT DOCUMENTS

| | | | |
|---|---|---|---|
| 2012/0024016 A1* | 2/2012 | Dunn | D06F 33/48 68/12.27 |
| 2015/0252509 A1* | 9/2015 | Heo | D06F 33/48 68/12.06 |
| 2020/0010999 A1 | 1/2020 | Cha | |
| 2020/0063315 A1 | 2/2020 | Yoon | |
| 2020/0392660 A1* | 12/2020 | Park | G06V 20/52 |
| 2021/0180234 A1* | 6/2021 | Funakoshi | D06F 37/40 |
| 2021/0363680 A1* | 11/2021 | Lee | G06V 10/82 |
| 2022/0049397 A1* | 2/2022 | Lee | D06F 23/04 |

\* cited by examiner

SYSTEMS AND METHODS OF OPERATING A WASHING MACHINE APPLIANCE TO DETECT AND MITIGATE OUT-OF-BALANCE CONDITIONS

FIELD OF THE INVENTION

The present subject matter relates generally to washing machine appliances, or more specifically, to systems and methods for using image recognition processes to assist with out-of-balance conditions in a washing machine appliance.

BACKGROUND OF THE INVENTION

Washing machine appliances generally include a cabinet which receives a wash tub for containing water or wash fluid (e.g., water and detergent, bleach, or other wash additives). The wash tub may be suspended within the cabinet by a suspension system to allow some movement relative to the cabinet during operation. A wash basket is rotatably mounted within the wash tub and defines a wash chamber for receipt of articles for washing. A drive assembly is coupled to the wash tub and is configured to selectively rotate the wash basket within the wash tub.

Washing machine appliances are typically equipped to operate in one or more modes or cycles, such as wash, rinse, and spin cycles. For example, during a wash or rinse cycle, the wash fluid is directed into the wash tub in order to wash and/or rinse articles within the wash chamber. In addition, the wash basket and/or an agitation element can rotate at various speeds to agitate or impart motion to articles within the wash chamber. During a spin cycle, the wash basket may be rotated at high speeds, e.g., to wring wash fluid from articles within the wash chamber.

A significant concern during operation of washing machine appliances is out-of-balance conditions within the wash tub. For example, articles and water loaded within a wash basket may not be equally weighted about a central axis of the wash basket and wash tub. Accordingly, when the wash basket rotates, in particular during a spin cycle, the imbalance in clothing weight may cause the wash basket to be out-of-balance within the wash tub, such that the axis of rotation does not align with the axis of the cylindrical wash basket or wash tub. Such out-of-balance issues can cause the wash basket to contact the wash tub during rotation and can further cause movement of the wash tub within the cabinet. Significant movement of the wash tub can, in turn, generate increased noise, vibrations, washer "walking," and/or cause excessive wear and premature failure of appliance components.

Various methods are known for monitoring load balances and addressing out-of-balance scenarios within washing machine appliances. Such monitoring and prevention may be especially important, for instance, during the high-speed rotation of the wash basket, e.g., during a spin cycle. However, such methods typically monitor load balance and detect out-of-balance states during the spin cycle, when the wash basket is already spinning at a high rate of speed. Accordingly, noise, vibration, movement, or damage may occur due to the out-of-balance detection.

Accordingly, improved methods and apparatus for monitoring load balance in washing machine appliances are desired. In particular, methods and apparatus which provide accurate monitoring and detection at earlier times during the wash cycle would be advantageous.

BRIEF DESCRIPTION OF THE INVENTION

Advantages of the invention will be set forth in part in the following description, or may be apparent from the description, or may be learned through practice of the invention.

In one exemplary embodiment, a washing machine appliance is provided, including a wash tub positioned within a cabinet, a wash basket rotatably mounted within the wash tub and defining a wash chamber configured for receiving a load of clothes, a motor assembly operably coupled to the wash basket for selectively rotating the wash basket, a drain pump assembly fluidly coupled to the wash tub for selectively draining wash fluid from the wash tub, a camera assembly mounted within the cabinet in view of the wash chamber, and a controller operably coupled to the camera assembly. The controller is configured to obtain one or more images of the wash chamber using the camera assembly, analyze the one or more images using a machine learning image recognition process to determine an out-of-balance value of the load of clothes in the wash basket, determine that the out-of-balance value is greater than a predetermined out-of-balance threshold, and perform a cloth redistribution process based at least in part on determining that the out-of-balance value is greater than the predetermined out-of-balance threshold.

In another exemplary embodiment, a method of operating a washing machine appliance is provided. The washing machine appliance includes a wash basket rotatably mounted within a wash tub and defining a wash chamber configured for receiving a load of clothes, a motor assembly for selectively rotating the wash basket, a drain pump assembly fluidly for selectively draining wash fluid from the wash tub, and a camera assembly mounted within in view of the wash chamber. The method includes obtaining one or more images of the wash chamber using the camera assembly, analyzing the one or more images using a machine learning image recognition process to determine an out-of-balance value of the load of clothes in the wash basket, determining that the out-of-balance value is greater than a predetermined out-of-balance threshold and performing a cloth redistribution process based at least in part on determining that the out-of-balance value is greater than the predetermined out-of-balance threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 1:
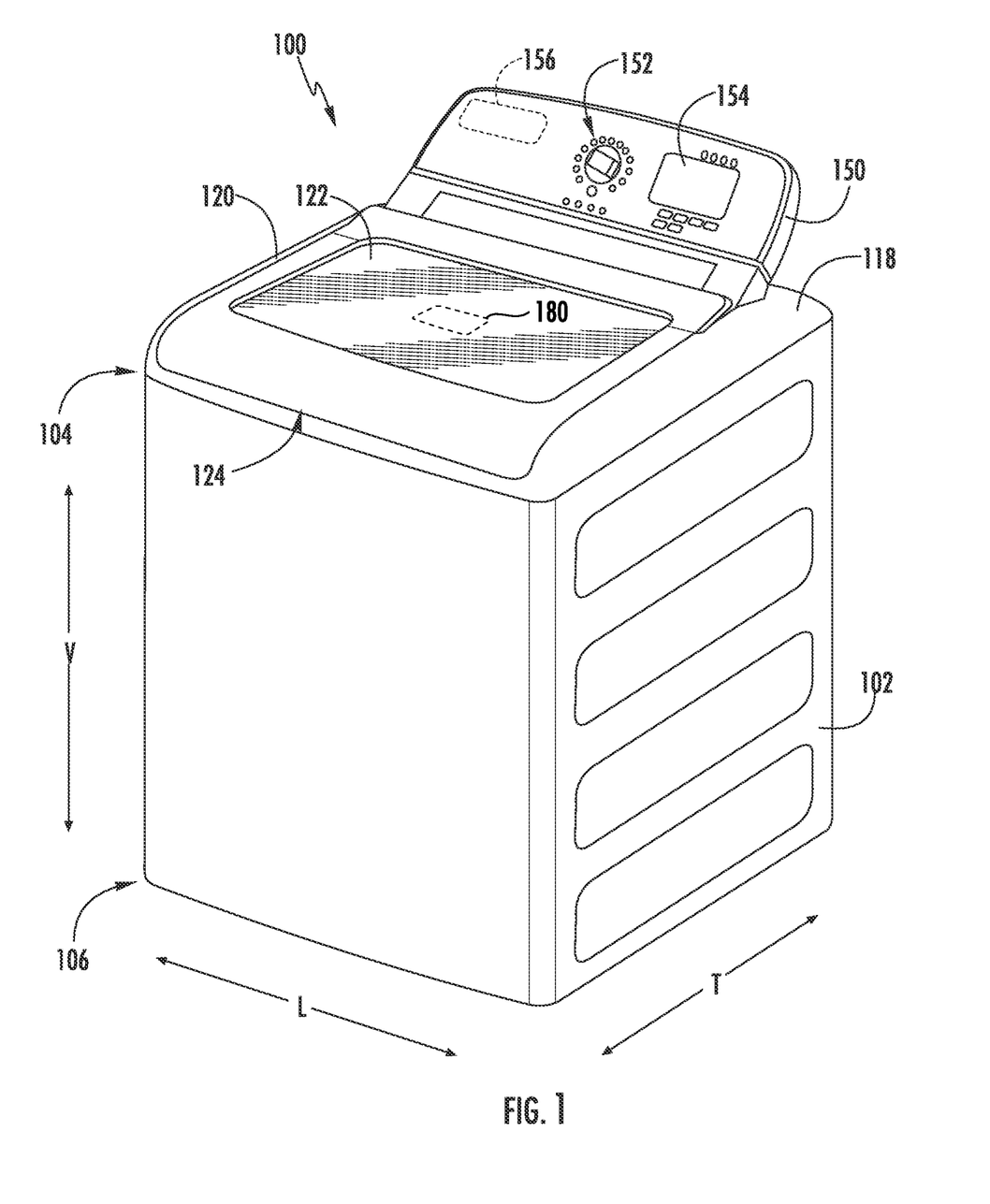
FIG. 1 provides a perspective view of a washing machine appliance according to an exemplary embodiment of the present subject matter with a door of the exemplary washing machine appliance shown in a closed position.
Figure 2:
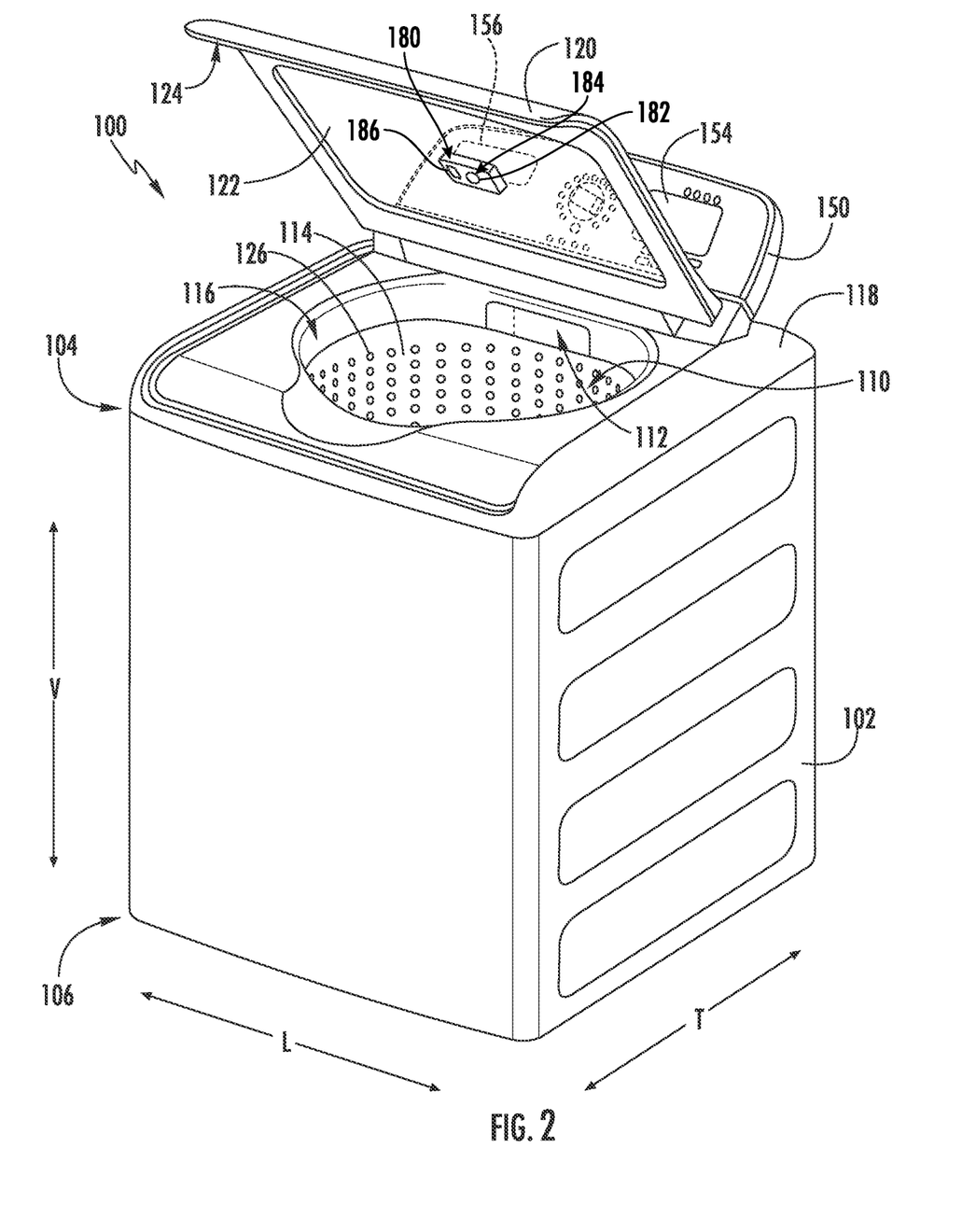
FIG. 2 provides a perspective view of the exemplary washing machine appliance of FIG. 1 with the door of the exemplary washing machine appliance shown in an open position.
Figure 3:
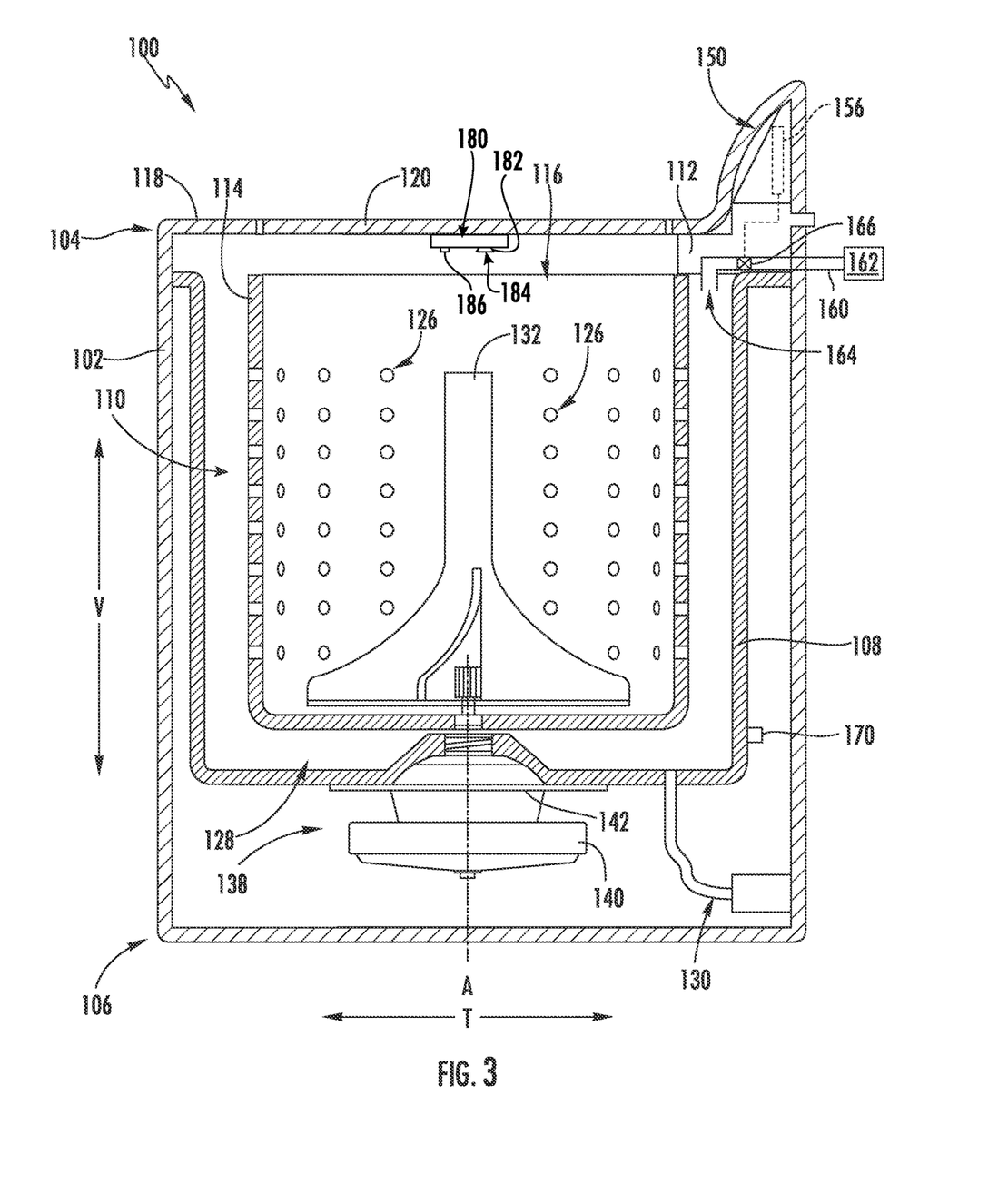
FIG. 3 provides a side cross-sectional view of the exemplary washing machine appliance of FIG. 1.

FIGS. 1 through 3 illustrate an exemplary embodiment of a vertical axis washing machine appliance 100. Specifically, FIGS. 1 and 2 illustrate perspective views of washing machine appliance 100 in a closed and an open position, respectively. FIG. 3 provides a side cross-sectional view of washing machine appliance 100. Washing machine appliance 100 generally defines a vertical direction V, a lateral direction L, and a transverse direction T, each of which is mutually perpendicular, such that an orthogonal coordinate system is generally defined.

While described in the context of a specific embodiment of vertical axis washing machine appliance 100, it should be appreciated that vertical axis washing machine appliance 100 is provided by way of example only. It will be understood that aspects of the present subject matter may be used in any other suitable washing machine appliance, such as a horizontal axis washing machine appliance. Indeed, modifications and variations may be made to washing machine appliance 100, including different configurations, different appearances, and/or different features while remaining within the scope of the present subject matter.

Washing machine appliance 100 has a cabinet 102 that extends between a top portion 104 and a bottom portion 106 along the vertical direction V, between a first side (left) and a second side (right) along the lateral direction L, and between a front and a rear along the transverse direction T.

As best shown in FIG. 3, a wash tub 108 is positioned within cabinet 102, defines a wash chamber 110, and is generally configured for retaining wash fluids during an operating cycle. Washing machine appliance 100 further includes a primary dispenser 112 (FIG. 2) for dispensing wash fluid into wash tub 108. The term "wash fluid" refers to a liquid used for washing and/or rinsing articles during an operating cycle and may include any combination of water, detergent, fabric softener, bleach, and other wash additives or treatments.

In addition, washing machine appliance 100 includes a wash basket 114 that is positioned within wash tub 108 and generally defines an opening 116 for receipt of articles for washing. More specifically, wash basket 114 is rotatably mounted within wash tub 108 such that it is rotatable about an axis of rotation A. According to the illustrated embodiment, the axis of rotation A is substantially parallel to the vertical direction V. In this regard, washing machine appliance 100 is generally referred to as a "vertical axis" or "top load" washing machine appliance 100. However, it should be appreciated that aspects of the present subject matter may be used within the context of a horizontal axis or front load washing machine appliance as well.

As illustrated, cabinet 102 of washing machine appliance 100 has a top panel 118. Top panel 118 defines an opening (FIG. 2) that coincides with opening 116 of wash basket 114 to permit a user access to wash basket 114. Washing machine appliance 100 further includes a door 120 which is rotatably mounted to top panel 118 to permit selective access to opening 116. In particular, door 120 selectively rotates between the closed position (as shown in FIGS. 1 and 3) and the open position (as shown in FIG. 2). In the closed position, door 120 inhibits access to wash basket 114. Conversely, in the open position, a user can access wash basket 114. A window 122 in door 120 permits viewing of wash basket 114 when door 120 is in the closed position, e.g., during operation of washing machine appliance 100. Door 120 also includes a handle 124 that, e.g., a user may pull and/or lift when opening and closing door 120. Further, although door 120 is illustrated as mounted to top panel 118, door 120 may alternatively be mounted to cabinet 102 or any other suitable support.

As best shown in FIGS. 2 and 3, wash basket 114 further defines a plurality of perforations 126 to facilitate fluid communication between an interior of wash basket 114 and wash tub 108. In this regard, wash basket 114 is spaced apart from wash tub 108 to define a space for wash fluid to escape wash chamber 110. During a spin cycle, wash fluid within articles of clothing and within wash chamber 110 is urged through perforations 126 wherein it may collect in a sump 128 defined by wash tub 108. Washing machine appliance 100 further includes a pump assembly 130 (FIG. 3) that is located beneath wash tub 108 and wash basket 114 for gravity assisted flow when draining wash tub 108.

An impeller or agitation element 132 (FIG. 3), such as a vane agitator, impeller, auger, oscillatory basket mechanism, or some combination thereof is disposed in wash basket 114 to impart an oscillatory motion to articles and liquid in wash basket 114. More specifically, agitation element 132 extends into wash basket 114 and assists agitation of articles disposed within wash basket 114 during operation of washing machine appliance 100, e.g., to facilitate improved cleaning. In different embodiments, agitation element 132 includes a single action element (i.e., oscillatory only), a double action element (oscillatory movement at one end, single direction rotation at the other end) or a triple action element (oscillatory movement plus single direction rotation at one end, single direction rotation at the other end). As illustrated in FIG. 3, agitation element 132 and wash basket 114 are oriented to rotate about axis of rotation A (which is substantially parallel to vertical direction V).

As best illustrated in FIG. 3, washing machine appliance 100 includes a drive assembly or motor assembly 138 in mechanical communication with wash basket 114 to selectively rotate wash basket 114 (e.g., during an agitation or a rinse cycle of washing machine appliance 100). In addition, motor assembly 138 may also be in mechanical communication with agitation element 132. In this manner, motor assembly 138 may be configured for selectively rotating or oscillating wash basket 114 and/or agitation element 132 during various operating cycles of washing machine appliance 100.

More specifically, motor assembly 138 may generally include one or more of a drive motor 140 and a transmission assembly 142, e.g., such as a clutch assembly, for engaging and disengaging wash basket 114 and/or agitation element 132. According to the illustrated embodiment, drive motor 140 is a brushless DC electric motor, e.g., a pancake motor. However, according to alternative embodiments, drive motor 140 may be any other suitable type or configuration of motor. For example, drive motor 140 may be an AC motor, an induction motor, a permanent magnet synchronous motor, or any other suitable type of motor. In addition, motor assembly 138 may include any other suitable number, types, and configurations of support bearings or drive mechanisms.

Referring still to FIGS. 1 through 3, a control panel 150 with at least one input selector 152 (FIG. 1) extends from top panel 118. Control panel 150 and input selector 152 collectively form a user interface input for operator selection of machine cycles and features. A display 154 of control panel 150 indicates selected features, operation mode, a countdown timer, and/or other items of interest to appliance users regarding operation.

Operation of washing machine appliance 100 is controlled by a controller or processing device 156 that is operatively coupled to control panel 150 for user manipulation to select washing machine cycles and features. In response to user manipulation of control panel 150, controller 156 operates the various components of washing machine appliance 100 to execute selected machine cycles and features. According to an exemplary embodiment, controller 156 may include a memory and microprocessor, such as a general or special purpose microprocessor operable to execute programming instructions or micro-control code associated with methods described herein. Alternatively, controller 156 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 150 and other components of washing machine appliance 100 may be in communication with controller 156 via one or more signal lines or shared communication busses.

During operation of washing machine appliance 100, laundry items are loaded into wash basket 114 through opening 116, and washing operation is initiated through operator manipulation of input selectors 152. Wash basket 114 is filled with water and detergent and/or other fluid additives via primary dispenser 112. One or more valves can be controlled by washing machine appliance 100 to provide for filling wash tub 108 and wash basket 114 to the appropriate level for the amount of articles being washed and/or rinsed. By way of example for a wash mode, once wash basket 114 is properly filled with fluid, the contents of wash basket 114 can be agitated (e.g., with agitation element 132 as discussed previously) for washing of laundry items in wash basket 114.

More specifically, referring again to FIG. 3, a water fill process will be described according to an exemplary embodiment. As illustrated, washing machine appliance 100 includes a water supply conduit 160 that provides fluid communication between a water supply source 162 (such as a municipal water supply) and a discharge nozzle 164 for directing a flow of water into wash chamber 110. In addition, washing machine appliance 100 includes a water fill valve or water control valve 166 which is operably coupled to water supply conduit 160 and communicatively coupled to controller 156. In this manner, controller 156 may regulate the operation of water control valve 166 to regulate the amount of water within wash tub 108.

Although water supply conduit 160, water supply source 162, discharge nozzle 164, and water control valve 166 are all described and illustrated herein in the singular form, it should be appreciated that these terms may be used herein generally to describe a supply plumbing for providing hot and/or cold water into wash chamber 110. In this regard, water supply conduit 160 may include separate conduits for receiving hot and cold water, respectively. Similarly, water supply source 162 may include both hot- and cold-water supplies regulated by dedicated valves. In addition, washing machine appliance 100 may include one or more pressure sensors 170 for detecting the amount of water and or clothes within wash tub 108. For example, pressure sensor 170 may be operably coupled to a side of tub 108 for detecting the weight of wash tub 108, which controller 156 may use to determine a volume of water in wash chamber 110 and a subwasher load weight.

After wash tub 108 is filled and the agitation phase of the wash cycle is completed, wash basket 114 can be drained, e.g., by drain pump assembly 130. Laundry articles can then be rinsed by again adding fluid to wash basket 114 depending on the specifics of the cleaning cycle selected by a user. The impeller or agitation element 132 may again provide agitation within wash basket 114. One or more spin cycles may also be used as part of the cleaning process. In particular, a spin cycle may be applied after the wash cycle and/or after the rinse cycle in order to wring wash fluid from the articles being washed. During a spin cycle, wash basket 114 is rotated at relatively high speeds to help wring fluid from the laundry articles through perforations 126. During or prior to the spin cycle, drain pump assembly 138 may operate to discharge wash fluid from wash tub 108, e.g., to an external drain. After articles disposed in wash basket 114 are cleaned and/or washed, the user can remove the articles from wash basket 114, e.g., by reaching into wash basket 114 through opening 116.

Referring now specifically to FIGS. 2 and 3, washing machine appliance 100 may further include a camera assembly 180 that is generally positioned and configured for obtaining images of a load of clothes within wash chamber 110 of washing machine appliance 100. Specifically, according to the illustrated embodiment, camera assembly 180 may include a camera 182 mounted to an underside of door 120 of washing machine appliance 100. In this manner, when door 120 is in the closed position, camera 182 may be positioned over wash chamber 110 and may be oriented for obtaining images within wash chamber 110. Specifically, camera 182 is mounted such that is faces toward a bottom side of wash tub 108. In this manner, camera 182 can take unobstructed images or video of an inside of wash chamber 110.

It should be appreciated that camera assembly 180 may include any suitable number, type, size, and configuration of camera(s) 182 for obtaining images of wash chamber 110. In general, cameras 182 may include a lens 184 that is constructed from a clear hydrophobic material or which may otherwise be positioned behind a hydrophobic clear lens. So positioned, camera assembly 180 may obtain one or more images or videos of clothes within wash chamber 110, as described in more detail below. It should be appreciated that other locations for mounting camera assembly 180 are possible, such as below or adjacent a discharge nozzle 164 of washing machine appliance 100.

Referring still to FIGS. 2 through 3, washing machine appliance 100 may further include a tub light 186 that is positioned within cabinet 102 or wash chamber 110 for selectively illuminating wash chamber 110 and the load of clothes positioned therein. Specifically, as shown in FIG. 2, tub light 186 may be integrated into camera assembly 180 and may be positioned immediately adjacent camera 182. According to still other embodiments, tub light 186 may be positioned at any other suitable location within cabinet 102. It should be appreciated that according to alternative embodiments, washing machine appliance 100 may include any other camera or system of imaging devices for obtaining images of the load of clothes. In addition, these cameras may be positioned at any suitable location within cabinet 102, may include any suitable lighting features, and may utilize any suitable photography or imaging technology.

Notably, controller 156 of washing machine appliance 100 (or any other suitable dedicated controller) may be communicatively coupled to camera assembly 180, tub light 186, and other components of washing machine appliance 100. As explained in more detail below, controller 156 may be programmed or configured for analyzing the images obtained by camera assembly 180, e.g., in order to determine the level of water or wash fluid within wash chamber 110 or other cycle information, and may use this information to make informed decisions regarding the operation of washing machine appliance 100.

While described in the context of a specific embodiment of vertical axis washing machine appliance 100, using the teachings disclosed herein it will be understood that vertical axis washing machine appliance 100 is provided by way of example only. Other washing machine appliances having different configurations, different appearances, and/or different features may also be utilized with the present subject matter as well, e.g., horizontal axis washing machine appliances. In addition, aspects of the present subject matter may be utilized in a combination washer/dryer appliance.

Now that the construction of washing machine appliance 100 and the configuration of controller 156 according to exemplary embodiments have been presented, an exemplary method 200 of operating a washing machine appliance will be described. Although the discussion below refers to the exemplary method 200 of operating washing machine appliance 100, one skilled in the art will appreciate that the exemplary method 200 is applicable to the operation of a variety of other washing machine appliances, such as horizontal axis washing machine appliances. In exemplary embodiments, the various method steps as disclosed herein may be performed by controller 156 or a separate, dedicated controller.

Figure 4:
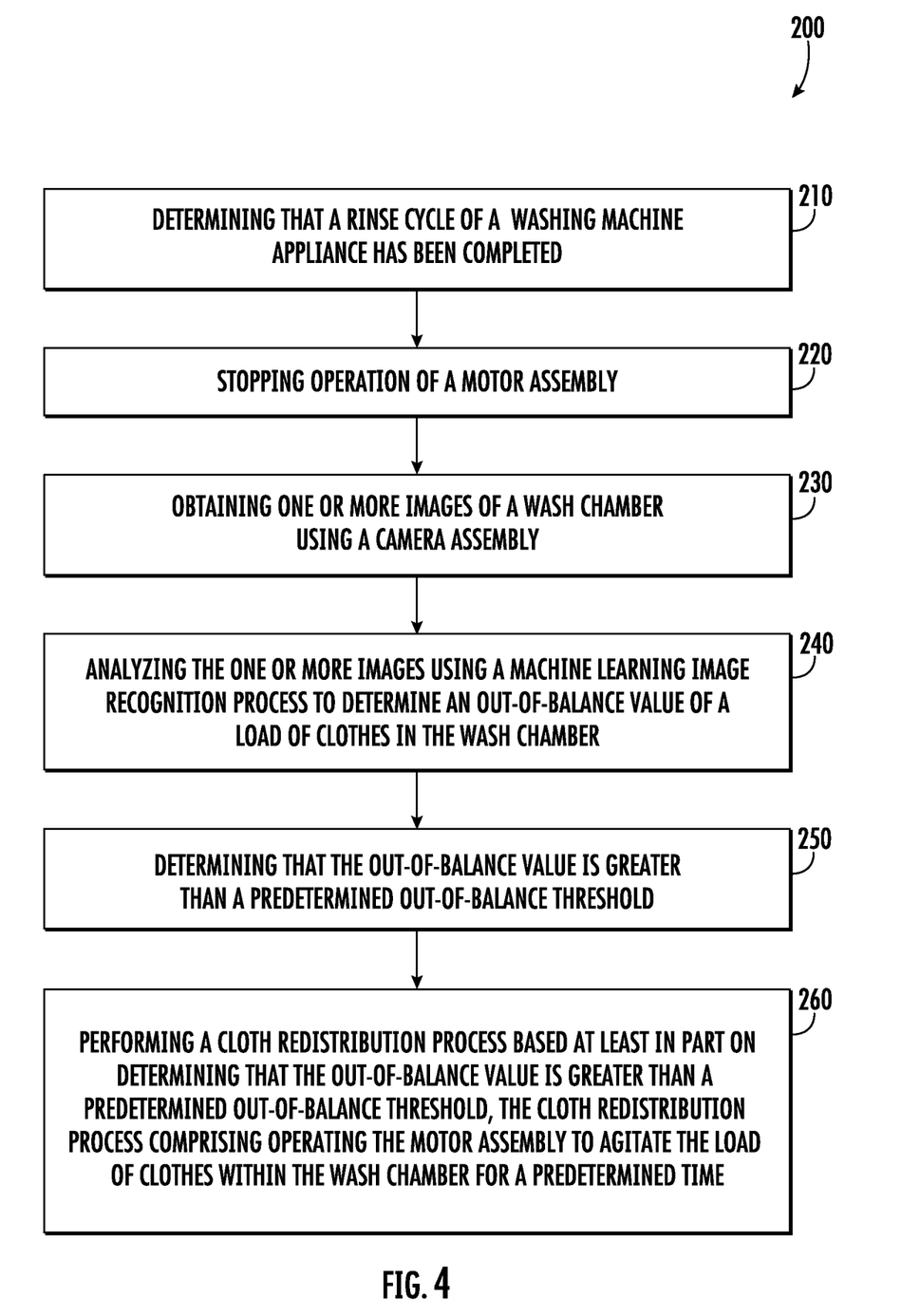
FIG. 4 illustrates a method for operating a washing machine appliance in accordance with one embodiment of the present disclosure.

Referring now to FIG. 4, method 200 includes, at step 210, determining that a rinse cycle of a washing machine appliance has been completed. In this regard, continuing the example from above, washing machine appliance 100 may generally perform an agitation or wash cycle where wash fluid is added to the tub and the load of clothes are agitated (e.g., using agitation element 132 and/or motor assembly 138) to remove stains, soils, and other undesirable contaminants. After the wash cycle, washing machine appliance 100 typically drains the wash fluid and performs a rinse cycle where fresh water is added to wash tub 108 and the clothes are agitated in order to rinse or extract wash fluid and/or detergent from the clothes. According to exemplary embodiments, more than one rinse cycle may be performed in order to remove some or all of the excess detergent from clothes.

Notably, conventional washing machine algorithms proceed directly from the final rinse cycle into the drain and/or spin cycles. In this regard, at the end of the rinse cycle, a drain pump may be operated to start discharging wash fluid during or just prior to a motor assembly spinning a wash basket to high speeds to extract excess wash fluid or water. However, if the load of clothes within the wash basket is not properly balanced or distributed within the wash basket at the commencement of this drain and/or spin cycle, out-of-balance conditions may occur which result in extreme vibrations and/or damage to the appliance. Moreover, if out-of-balance vibrations are detected (e.g., by an accelerometer) after the wash fluid has been drained, it is more difficult to redistribute clothes within the wash basket, e.g., to correct the out-of-balance issues. Specifically, for top load washing machine appliance, out-of-balance issues detected during the spin cycle may require the wash tub 108 to be refilled in order to "float" the clothes to permit their redistribution. As a result, time, energy, and water may be wasted.

Consequently, aspects of the present subject matter are directed to methods for detecting such out-of-balance conditions prior to draining the wash fluid and initiating spin cycle. As a result, step 210 of method 200 includes determining that the rinse cycle has been completed. In addition, step 220 may include stopping operation of a motor assembly of the appliance. In this regard, it may be desirable to stop the rotation of wash basket 114 and/or agitation element 132 so that the clothes within wash basket 114 may settle in position. With the clothes settled within wash basket 114, method 200 may further include analyzing the clothes to determine or predict whether an out-of-balance condition is present, the severity of such an out-of-balance condition, and/or the resulting vibrations that may occur due to such out-of-balance conditions.

Specifically, step 230 may include obtaining one or more images of a wash chamber using a camera assembly. In this regard, continuing the example from above, camera assembly 180 may be used to obtain one or more images of wash chamber 110. As explained in more detail below, these images may be used to determine a distribution of clothes within wash chamber 110 in order to predict potential out-of-balance conditions that would cause undesirable vibrations or other operational issues at high-speed spin, e.g., such as a plaster or hold speed. By identifying an improper distribution of clothes at this early stage, corrective action may be taken with little or no extension of the total cycle time. Moreover, identification of such issues at this stage may prevent the unnecessary steps of draining wash fluid and refilling wash tub 108 in the event redistribution is needed.

Thus, step 230 includes obtaining one or more images, a series of frames, a video, or any other visual representation of the load of clothes within wash chamber 110. For example, camera assembly 180 may obtain a video clip of the wash basket, take a still image from the video clip, or otherwise obtain a still representation or photo from the video clip. It should be appreciated that the images obtained by camera assembly 180 may vary in number, frequency, angle, resolution, detail, etc. in order to improve the clarity of the load of clothes. In addition, according to exemplary embodiments, controller 156 may be configured for illuminating the tub using tub light 186 just prior to obtaining images.

Referring still to FIG. 4, method 200 may include, at step 240, analyzing the one or more images using a machine learning image recognition process to determine a cloth coverage ratio or an out-of-balance value of a load of clothes in the wash chamber. It should be appreciated that any suitable image processing or recognition method may be used to analyze the images obtained at step 230 and facilitate determination of the out-of-balance value. In addition, it should be appreciated that this image analysis or processing may be performed locally (e.g., by controller 156) or remotely (e.g., by a remote server).

As used herein, the term "out-of-balance value" is generally intended to refer to a measure of the balance of clothes within a washing machine appliance. For example, this out-of-balance ratio may be quantified in as a weight of clothes (e.g., X pounds out-of-balance) and may further include an orientation of the out-of-balance or excess mass (e.g., as a specific circumferential position within the wash chamber). The out-of-balance value may generally represent any qualitative or quantitative representation of the balance of clothes within the wash basket. According to example embodiments, this out-of-balance value may be determined or quantified based at least in part on the cloth coverage ratio, or a ratio of the area of a wash basket covered in clothes over a total area of the wash basket (e.g., of an empty basket), or to otherwise represent the distribution or coverage of clothes within a wash basket.

For example, the cloth coverage ratio may refer generally to the percentage of clothes that are visible within wash basket 114 relative to the total image area, a volume of the load of clothes located at each circumferential region within wash basket, or any other suitable representation of the distribution of clothes within wash basket 114. By contrast, according to alternative embodiments, the cloth coverage ratio may be a ratio of pixels of an image that includes clothes over the total number of pixels in the image or the number of pixels showing wash basket 114. In addition, according to exemplary embodiments, cloth coverage ratio or out-of-balance value may refer to the distribution of clothes around wash basket 114, such as a quantitative or qualitative measure of how well clothes are spread around a central axis of wash basket 114.

According to exemplary embodiments of the present subject matter, step 240 of analyzing the one or more images may include analyzing the image(s) of the wash chamber using a neural network classification module and/or a machine learning image recognition process. In this regard, for example, controller 156 may be programmed to implement the machine learning image recognition process that includes a neural network trained with a plurality of images of baskets with different cloth coverage ratios, cloth distribution levels, or out-of-balance values. By analyzing the image(s) obtained at step 230 using this machine learning image recognition process, controller 156 may determine or approximate the out-of-balance value or cloth distribution level, e.g., by identifying the trained image that is closest to the obtained image.

As used herein, the terms image recognition process and similar terms may be used generally to refer to any suitable method of observation, analysis, image decomposition, feature extraction, image classification, etc. of one or more images or videos taken within a wash chamber of a washing machine appliance. In this regard, the image recognition process may use any suitable artificial intelligence (AI) technique, for example, any suitable machine learning technique, or for example, any suitable deep learning technique. It should be appreciated that any suitable image recognition software or process may be used to analyze images taken by camera assembly 180 and controller 156 may be programmed to perform such processes and take corrective action.

According to an exemplary embodiment, controller may implement a form of image recognition called region based convolutional neural network ("R-CNN") image recognition. Generally speaking, R-CNN may include taking an input image and extracting region proposals that include a potential object, such as a particular garment or region of a load of clothes. In this regard, a "region proposal" may be regions in an image that could belong to a particular object, such as a particular article of clothing or the wash basket. A convolutional neural network is then used to compute features from the regions proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like.

According to still other embodiments, the image recognition process may use any other suitable neural network process. For example, step 240 may include using Mask R-CNN instead of a regular R-CNN architecture. In this regard, Mask R-CNN is based on Fast R-CNN which is slightly different than R-CNN. For example, R-CNN first applies CNN and then allocates it to zone recommendations on the covn5 property map instead of the initially split into zone recommendations. In addition, according to exemplary embodiments standard CNN may be used to analyze the image determine a, out-of-balance value or cloth distribution level within wash basket 114. In addition, a K-means algorithm may be used. Other image recognition processes are possible and within the scope of the present subject matter.

It should be appreciated that any other suitable image recognition process may be used while remaining within the scope of the present subject matter. For example, step 240 may include using a deep belief network ("DBN") image recognition process. A DBN image recognition process may generally include stacking many individual unsupervised networks that use each network's hidden layer as the input for the next layer. According to still other embodiments, step 240 may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence ("AI") analysis techniques, and combinations of the above described or other known methods may be used while remaining within the scope of the present subject matter.

Step 250 may include determining that the out-of-balance value is greater than the predetermined out-of-balance threshold. In this regard, for example, if the out-of-balance value is greater than the predetermined out-of-balance threshold, this may indicate that an out-of-balance condition is present and may produce undesirable vibrations. By contrast, if the out-of-balance value is less than or equal to the predetermined out-of-balance threshold, this may indicate that any out-of-balance condition is sufficiently minor as to not cause operational issues or undesirable vibrations within washing machine appliance 100.

It should be appreciated that the predetermined out-of-balance threshold may be determined or obtained in any suitable manner. For example, a predetermined out-of-balance threshold may be based at least in part on at least one of a load size, a cloth type of the load of clothes, or a cycle selected. The predetermined out-of-balance threshold may be set by a user, may be programmed by the manufacturer, or may be determined by algorithm and may relate to a suitable threshold for entering the high-speed spin cycle with minimal risk of high out-of-balance conditions. In this regard, as will be explained in more detail below, if the out-of-balance value falls below the predetermined out-of-balance threshold, controller 156 may presume that it is safe to enter the high-speed spin cycle and/or drain cycle. In this cycle, drive motor 140 will spin wash basket 114 to a very high speed, referred to herein as the plaster speed or hold speed, for a predetermined amount of time in order to extract excess water from clothes, e.g., under large centrifugal force. It should be appreciated that the hold speed may be predetermined by controller 156, may be programmed by a manufacturer, may be set by the user, or may be determined in any other suitable manner. Moreover, the predetermined hold speed may vary depending on a variety of factors, such as load size, load type, etc. By contrast, if the out-of-balance value (e.g., as determined at step 240) is greater than the predetermined out-of-balance threshold (e.g., determined at step 250), controller 156 may determine that it is not safe to enter the high-speed portion of the spin cycle without producing extreme vibrations or out-of-balance conditions.

It should be appreciated that the predetermined out-of-balance threshold may depend in large part based on a load size, a load type, or other quantitative or qualitative aspects of the load of clothes. For example, if the load size is small and contains lightweight and delicate garments, the predetermined out-of-balance threshold may be relatively high, since the risk of large out-of-balance conditions is minimal. By contrast, if the load size is large and contains heavy blankets or cotton towels, the predetermined out-of-balance threshold may be relatively low, since the risk of harmful vibrations resulting from the out-of-balance condition may be relatively high. Thus, controller 156 may use conventional load size algorithms to determine the load size and the predetermined out-of-balance threshold.

Step 260 may include performing a cloth redistribution process based at least in part on determining that the out-of-balance value is greater than the predetermined out-of-balance threshold. In this regard, the "cloth redistribution process" generally refers to any sequence of actions or adjustments made by or to washing machine appliance 100 for repositioning or redistributing clothes within wash basket 114. In this regard, for example, controller 156 may be programmed to adjust at least one operating parameter of the washing machine appliance upon determining that a cloth redistribution process is needed. In this regard, controller 156 may be programmed for operating the motor assembly 138, agitation element 132, drain pump assembly 130, and/or water control valve 166 to implement corrective action in order to redistribute clothes within wash basket 114. By contrast, if no cloth redistribution is needed, controller 156 may implement a normal drain and spin cycle.

For example, as described briefly above, the comparison of the out-of-balance value and predetermined out-of-balance threshold may include a determination that the out-of-balance value is less than the predetermined out-of-balance threshold. Notably, when the out-of-balance value falls below the predetermined out-of-balance threshold (e.g., the out-of-balance value for safe high-speed spin operation), controller 156 may know that it is safe to implement the spin cycle with minimal risk of the harmful out-of-balance conditions. As a result, controller 156 may be programmed to perform a spin cycle, e.g., by operating drain pump assembly 130 to drain wash fluid from wash tub 108 and operating motor assembly 138 to rotate wash basket 114 up to a suitable spin speed.

By contrast, the comparison of the out-of-balance value and predetermined out-of-balance threshold may also result in a determination that the out-of-balance value is greater than the predetermined out-of-balance threshold. In this regard, step 260 is an additional step intended to rectify the out-of-balance conditions and lower the out-of-balance value. In this regard, for example, controller 156 may operate drive motor 140 to perform a redistribution stroke or a sequence of redistribution strokes. In this regard, a redistribution stroke may be an extended stroke in a single direction for a predetermined amount of time (e.g., 5 seconds, 10 seconds, 20 seconds, 30 seconds, or more). This redistribution stroke may be followed by another redistribution stroke in the alternative direction for another predetermined amount of time and any other suitable number and sequence of redistribution strokes. It should be appreciated that any suitable sequence of strokes, directions, stroke speeds, stroke durations, or other agitation means may be used while remaining within scope the present subject matter.

Notably, after it is discovered that the out-of-balance value is greater than the predetermined out-of-balance threshold, method 200 may include monitoring images obtained by camera assembly 180 to determine whether clothes are still shuffling or redistributing within wash chamber 110. If analysis of these images (e.g., using image analysis methods described herein) results in a determination that clothes are still tumbling or redistributing within wash chamber 110 (e.g., such that the out-of-balance value is changing), method 200 may include continuing the redistribution process for a fixed amount of time or until the image is showing a lowered out-of-balance value.

By contrast, if it is determined that the out-of-balance value is greater than the predetermined out-of-balance threshold and subsequent image comparison results in a determination that clothes are not shuffling or redistributing within wash chamber 110 (e.g., such that the out-of-balance value is not changing), this may indicate that the clothes are clumped, fixed, or otherwise lodged within positioned in wash basket 114. As a result, method 200 may include implementing additional actions to dislodge or redistribute the load of clothes. For example, according to an exemplary embodiment, method 200 may include operating water control valve 166 to add more water into wash tub 108. In this regard, adding water may help dislodge clothes and may lift clothes off the bottom of wash basket 114, e.g., to float the clothes and permit easier redistribution. Other suitable actions for redistributing clothes are possible and within scope the present subject matter.

Notably, this process of attempting to improve the distribution of clothes within wash basket 114, while useful in reducing the likelihood of harmful out-of-balance conditions while wash basket 114 is spinning at the plaster speed, may be undesirable if run indefinitely. Specifically, if clothes are not redistributing as desired, the out-of-balance value may never drop below the predetermined out-of-balance threshold, thus resulting in an endless rebalancing/redistributing cycle. To prevent this, method 200 may further include initiating a countdown timer at the end of the rinse cycle, upon stopping the motor assembly (e.g., at step 220), and/or prior to the commencement of the redistribution process. The redistribution process may continue until the countdown timer has expired. If the timer expires and the redistribution process has not succeeded, washing machine appliance 100 may continue into the spin cycle and/or drain cycle in order to complete the appliance operating cycle. According to this exemplary embodiment, controller 156 may implement or rely on other out-of-balance mitigation techniques during high speed spin in order to prevent harmful or damaging operating conditions of washing machine appliance 100.

Figure 5:
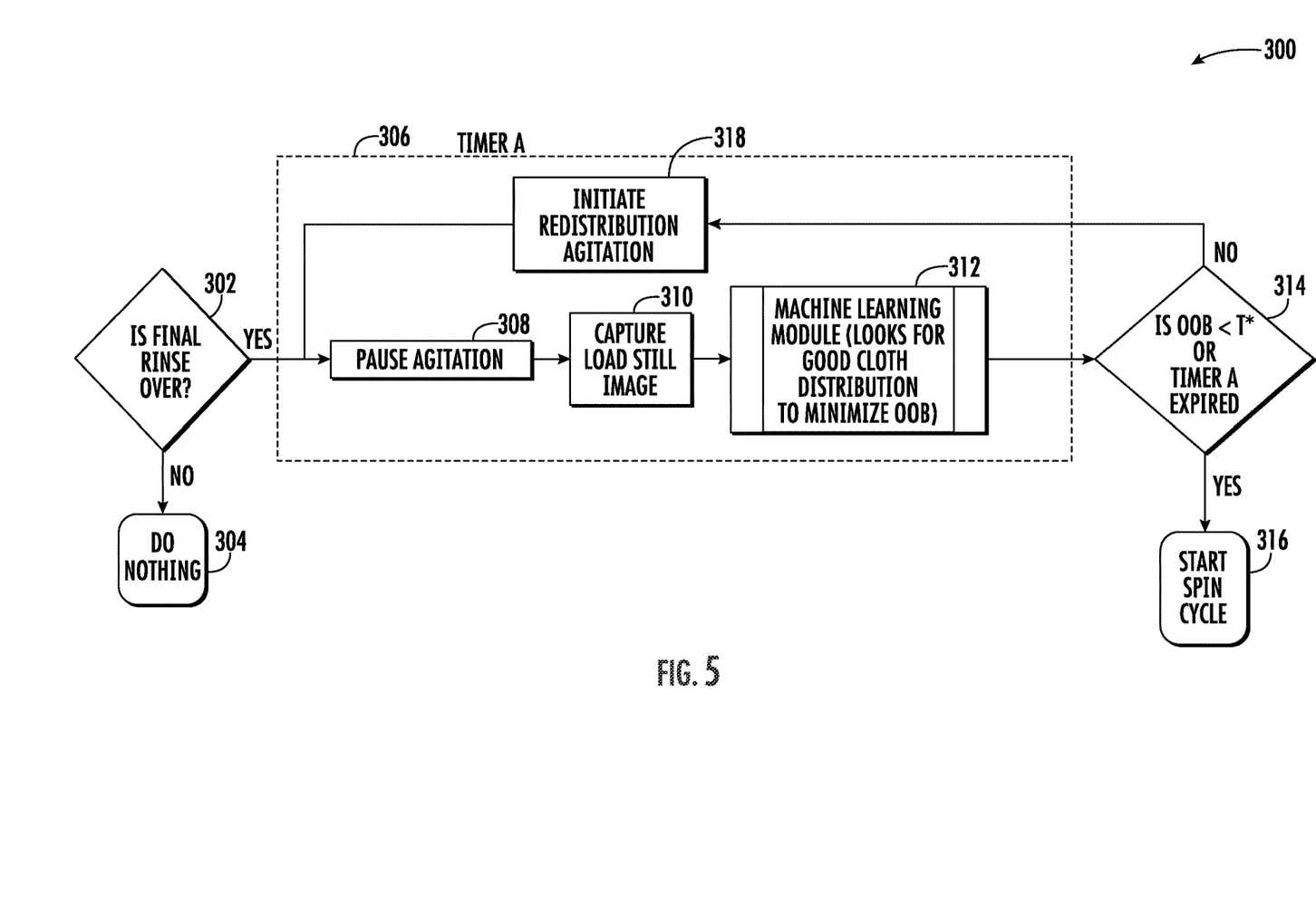
FIG. 5 provides a flow diagram of an exemplary process for implementing a water level detection method in a washing machine appliance according to an exemplary embodiment of the present subject matter.

Referring now briefly to FIG. 5, an exemplary flow diagram of an out-of-balance detection, correction, and assistance method 300 that may be implemented by washing machine appliance 100 will be described according to an exemplary embodiment of the present subject matter. According to exemplary embodiments, method 300 may be similar to or interchangeable with method 200 and may be implemented by controller 156 of washing machine appliance 100. As shown, at step 302, controller 156 may first determine whether the final rinse cycle has been completed. If the final rinse cycle is not completed, method 300 may include doing nothing at 304 and continuing the normal operating process, e.g., the final rinse cycle.

If at step 302 it is determined that the final rinse cycle is over and it is desirable to initiate a drain and spin cycle, method 300 may include initiating a timer (e.g., as identified generally by reference numeral 306). As explained above, timer 306 is generally configured for kicking method 300 out of the redistribution process in the event it is taking too long and is not successful. Method 300 may further include, at step 308, pausing agitation of wash chamber 110, e.g., by stopping the operation of motor assembly 138. After the load of clothes has settled within the wash basket, step 310 may include capturing a still image of the load of clothes. For example, this image may be obtained using camera assembly 180.

Step 312 includes implementing a machine learning module to determine an out-of-balance value from the images obtained at step 310. For example, the image analysis performed in 312 may be the same or similar to the image analysis performed at step 240 as described above. At step 314, the out-of-balance value determined at step 312 is compared to a predetermined out-of-balance threshold (e.g., which may be determined based on the load size, load type, or other quantitative or qualitative parameters associated with the load of clothes). If the out-of-balance value is less than the predetermined out-of-balance threshold, step 316 may include initiating a spin cycle and/or a drain cycle to remove wash fluid from wash tub 108 and extract excess wash fluid from the load of clothes by spinning wash basket 114 at high-speed. Notably, step 314 may also include determining that the timer has expired, in which case the spin/drain cycle may be performed.

By contrast, if the out-of-balance value is greater than the predetermined out-of-balance threshold, step 318 may include performing a cloth redistribution process. In this regard, the cloth redistribution process may be same or similar to that performed at step 260. For example, the cloth redistribution process may include performing a sequence of agitating strokes or basket spins while wash fluid remains within wash tub 108. In addition, the redistribution process may include adding additional water to ensure that the clothes are floating and free from binding against wash basket 114, agitation element 132, and/or other clothes within wash chamber 110. Additional images may be obtained at step 310 and additional machine learning analysis may be performed at step 312 until the out-of-balance is below the desired threshold or the timer has expired.

FIGS. 4 and 5 depict steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 and method 300 are explained using washing machine appliance 100 as an example, it should be appreciated that this method may be applied to the operation of any suitable laundry appliance, such as another washing machine appliance.

The systems and methods described herein provide for an intelligent out-of-balance assist cycle for a washer that utilizes artificial intelligence neural networks to analyze images of a wash tub to determine the distribution of clothes within the wash chamber and predict the out-of-balance level or the vibrations that might occur if corrective action is not taken. If the predicted out-of-balance levels exceed some predetermined suitability threshold, the washing machine appliance may implement a cloth redistribution process, agitating the clothes with a redistribution stroke (e.g., a sequence of extended strokes in a opposite directions) to redistribute the clothes prior to the spin cycle and prior to draining the wash fluid from the wash tub (which assists the clothes in redistributing). If the redistribution is not successful, more water may be added to float the clothes and permit redistribution. After a suitable cloth distribution is achieved, the wash tub may be drained and a spin cycle may be performed to shed wash fluid from the clothes with minimal out-of-balance issues or vibrations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance, comprising:
a wash tub positioned within a cabinet;
a wash basket rotatably mounted within the wash tub and defining a wash chamber configured for receiving a load of clothes;
a motor assembly operably coupled to the wash basket for selectively rotating the wash basket;

a drain pump assembly fluidly coupled to the wash tub for selectively draining wash fluid from the wash tub;
a camera assembly mounted within the cabinet in view of the wash chamber; and
a controller operably coupled to the camera assembly, the controller being configured to:
  determine that a rinse cycle has been completed;
  stop operating the motor assembly until the load of clothes has settled;
  obtain one or more images of the wash chamber using the camera assembly after the load of clothes has settled and prior to draining the wash fluid from the wash tub;
  analyze the one or more images using a machine learning image recognition process to determine an out-of-balance value of the load of clothes in the wash basket;
  determine that the out-of-balance value is greater than a predetermined out-of-balance threshold; and
  perform a cloth redistribution process based at least in part on determining that the out-of-balance value is greater than the predetermined out-of-balance threshold.

2. The washing machine appliance of claim 1, wherein the controller is further configured to:
  initiate a countdown timer upon stopping the motor assembly, the countdown timer having a predetermined duration;
  determine that the countdown timer has expired; and
  perform a spin cycle in response to determining that the countdown timer has expired.

3. The washing machine appliance of claim 1, wherein the controller is further configured to:
  determine that the out-of-balance value is less than the predetermined out-of-balance threshold; and
  perform a spin cycle.

4. The washing machine appliance of claim 3, wherein performing the spin cycle comprises:
  operating the drain pump assembly to drain the wash fluid from the wash tub; and
  operating the motor assembly to rotate the wash basket at a spin speed.

5. The washing machine appliance of claim 1, wherein the controller is further configured to:
  obtain at least one of a load size, a cloth type of the load of clothes, or a cycle selected; and
  determine the predetermined out-of-balance threshold based at least in part on at least one of the load size or the cloth type.

6. The washing machine appliance of claim 1, wherein performing the cloth redistribution process comprises:
  operating the motor assembly to agitate the load of clothes within the wash basket for a predetermined time.

7. The washing machine appliance of claim 6, further comprising a water supply for selectively supplying the wash fluid into the wash tub, wherein the controller is further configured to:
  determine that the cloth redistribution process failed to redistribute the load of clothes;
  operate the water supply to add the wash fluid into the tub; and
  reperform the cloth redistribution process.

8. The washing machine appliance of claim 1, wherein the machine learning image recognition process comprises at least one of a convolution neural network ("CNN"), a region-based convolution neural network ("R-CNN"), a deep belief network ("DBN"), or a deep neural network ("DNN") image recognition process.

9. The washing machine appliance of claim 1, wherein the camera assembly includes a light source for illuminating the wash chamber while obtaining the one or more images.

10. The washing machine appliance of claim 1, wherein the camera assembly is mounted above the wash chamber and faces the wash chamber.

11. The washing machine appliance of claim 1, wherein the camera assembly is mounted proximate a top of the wash tub and is oriented downward toward the wash chamber.

12. A method of operating a washing machine appliance, the washing machine appliance comprising a wash basket rotatably mounted within a wash tub and defining a wash chamber configured for receiving a load of clothes, a motor assembly for selectively rotating the wash basket, a drain pump assembly fluidly for selectively draining wash fluid from the wash tub, and a camera assembly mounted within in view of the wash chamber, the method comprising:
  determining that a rinse cycle has been completed;
  stopping operating the motor assembly until the load of clothes has settled;
  obtaining one or more images of the wash chamber using the camera assembly after the load of clothes has settled and prior to draining the wash fluid from the wash tub;
  analyzing the one or more images using a machine learning image recognition process to determine an out-of-balance value of the load of clothes in the wash basket;
  determining that the out-of-balance value is greater than a predetermined out-of-balance threshold; and
  performing a cloth redistribution process based at least in part on determining that the out-of-balance value is greater than the predetermined out-of-balance threshold.

13. The method of claim 12, further comprising:
  initiating a countdown timer upon stopping the motor assembly, the countdown timer having a predetermined duration;
  determining that the countdown timer has expired; and
  performing a spin cycle in response to determining that the countdown timer has expired.

14. The method of claim 12, further comprising:
  determining that the out-of-balance value is less than the predetermined out-of-balance threshold; and
  performing a spin cycle.

15. The method of claim 14, wherein performing the spin cycle comprises:
  operating the drain pump assembly to drain the wash fluid from the wash tub; and
  operating the motor assembly to rotate the wash basket at a spin speed.

16. The method of claim 12, further comprising:
  obtaining at least one of a load size, a cloth type of the load of clothes, or a cycle selected; and
  determining the predetermined out-of-balance threshold based at least in part on at least one of the load size or the cloth type.

17. The method of claim 16, wherein performing the cloth redistribution process comprises:
  operating the motor assembly to agitate the load of clothes within the wash basket for a predetermined time.

18. The method of claim 12, wherein the washing machine appliance further comprises a water supply for selectively supplying the wash fluid into the wash tub, wherein the method further comprises:

determining that the cloth redistribution process failed to redistribute the load of clothes;

operating the water supply to add the wash fluid into the tub; and reperforming the cloth redistribution process.

* * * * *